Oct. 21, 1947.    C. R. SHADE    2,429,374
TREE AND ORCHARD SPRAYING APPARATUS
Filed May 16, 1946
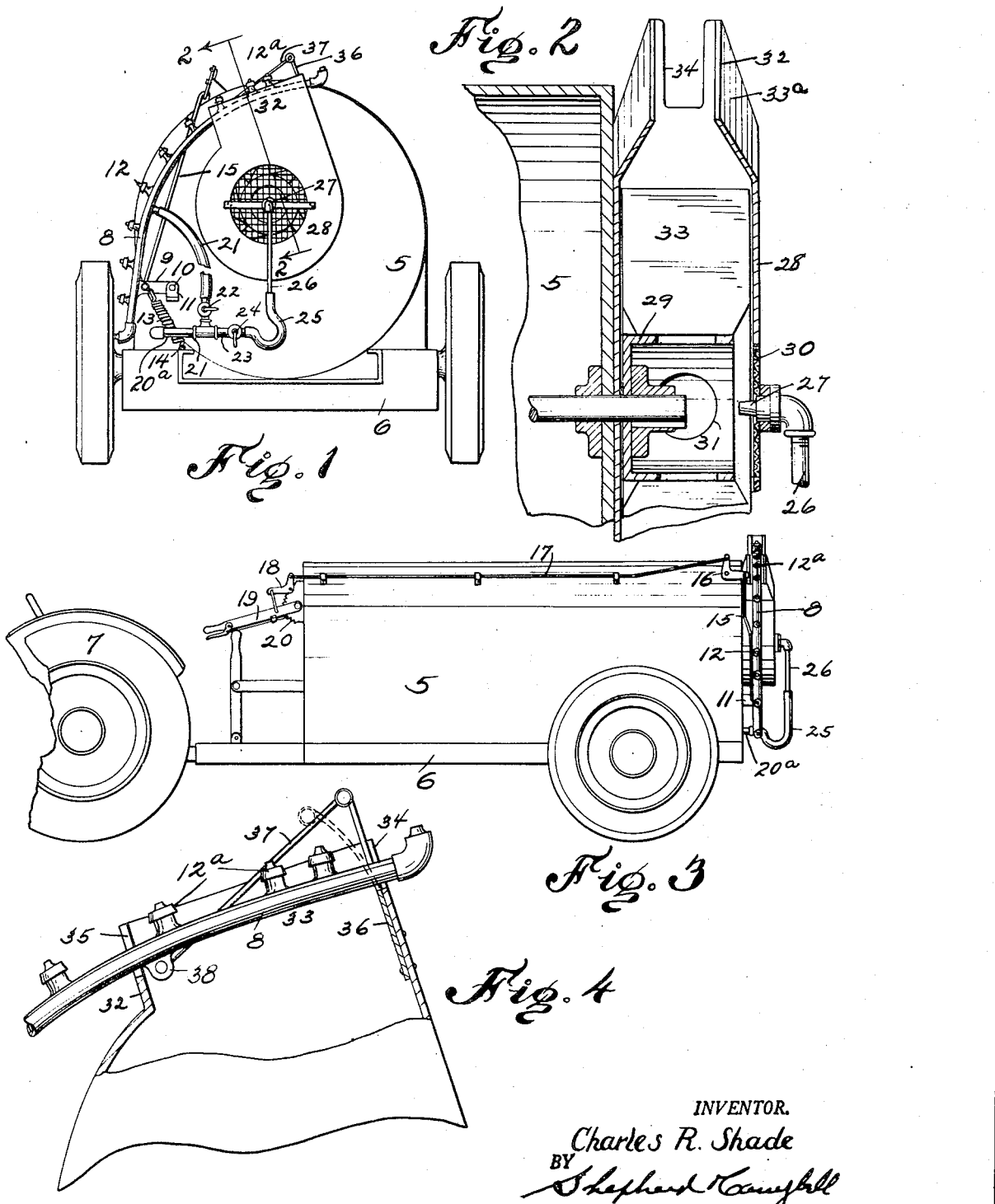
INVENTOR.
Charles R. Shade
BY
Shepherd Kampbell Patented Oct. 21, 1947

2,429,374

UNITED STATES PATENT OFFICE 2,429,374

TREE AND ORCHARD SPRAYING APPARATUS

Charles R. Shade, Gerrardstown, W. Va.

Application May 16, 1946, Serial No. 670,221

5 Claims. (Cl. 261—30)

This invention relates to spraying and apparatus especially to apparatus for spraying trees in orchards and like places.

The object of the invention is to provide a simple and efficient means for delivering the spray to and upon the trees in the most efficient way. The means by which I accomplish the object of the invention will be best understood by reference to the accompanying drawings wherein:

Figure 1 is rear elevation of a wheeled spray tank having the apparatus of my invention applied thereto.

Figure 2 is a sectional view upon line 2—2 of Figure 1.

Figure 3 is a general side elevation of the apparatus, and

Figure 4 is a view partly in rear elevation and partly in section of the outlet portion of the blower casing hereinafter described.

Like numerals designate corresponding parts in all the figures of the drawing.

In the drawings, 5 designates a tank which receives the spraying material. This is of conventional form and it may be mounted either upon a trailer 6 as indicated, to be drawn behind a tractor, the rear wheels of which are indicated at 7 or it may be in the form of a truck in which case the front wheels of the truck would stand at approximately the position of the tractor wheels 7. The invention resides in the apparatus for delivering the spray in an efficient manner from the tank 5 as the vehicle travels along between the rows of trees in an orchard, for example. The rest of the apparatus is conventional and may be varied in any desired way.

The salient feature of the invention resides in providing means for delivering the spray material in an arcuate or fan-like web laterally of the line of travel of the vehicle and to vertically swing the web of spray material in such manner as to cause it to spray the lower portions of the trees or to spray the tops of the trees.

In the spraying apparatus at present employed much of the spray material is lost in the attempt to discharge it into the tops of the trees, if the wind is blowing to any appreciable extent. I contemplate the provision of an air blast which can be directed along with the spray and in a controllable manner to largely nullify the effect of any light wind which may be blowing.

Referring now to Figure 2, 8 designates an arcuate pipe pivotally supported by an arm 9 from the pivot pin 10 on bracket 11 which is secured to the end wall of the tank. The pipe 8 carries a plurality of spray nozzles 12 and these are disposed more or less radially and in such manner as to direct the spray of the nozzles toward the lower portions of the trees, while the upper spray nozzles 12a direct the spray material into the tops of the trees. The pipe 8 with its bank of spray nozzles swings bodily in a direction across the line of travel of the vehicle. Any suitable means may be provided for imparting this swinging movement to the pipe. The particular arrangement chosen for the purpose of illustration comprises a spring 13 which is attached to the arm 9 and to a part of the vehicle frame indicated at 14. This spring tends to draw downwardly upon arm 9 and consequently to swing the upper end of the pipe 8 upwardly and outwardly. It is to be noted that the arm 9 which constitutes the pivotal mounting for the pipe 8 is located quite close to the lower end of the pipe. In the particular embodiment shown in Fig. 1 the portion of the pipe which extends below the pivotal mounting is less than one-sixth the length of the part which lies above such pivotal mounting. This pivoting of the pipe adjacent its lower end is a feature of great importance because the result is that the change in the direction of discharge of the lowermost nozzles is but a small fraction of the directional change of the nozzles along the upper portion of the pipe. This in turn maintains the spray almost uniform (or directly sidewise) into the lower branches of the trees, while permitting the spray into the upper branches to be adjusted to fit the strength of a cross wind through said uppermost branches. It will be readily understood that other trees in the orchard give more protection against cross winds through the lower branches than through the sparser upper branches. While I have referred to the element 8 as a pipe in the sense that it conducts the spray material to the nozzles it is more than a pipe in that it acts as a boom or carrier to carry the spray nozzles in a row and to dispose them in varying positions of adjustment in vertical planes at one side and across the line of travel of the vehicle. Any structure so carrying and adjusting the position of a row of arcuately disposed spray nozzles and supplying pressure spray liquid thereto would be the equivalent of the pipe. The position to which the pipe may be adjusted may be determined by the movement of the rod 15, the lower end of which is attached to arm 9 and the upper end of which is attached to a bell crank lever 16. The other arm of this bell crank lever is connected by a rod 17 to a bell crank lever 18. A latch lever 19 acting over a conventional ratchet 20 provides means for manually adjusting the position of the lateral swing of pipe 8. The spray material is delivered to pipe 8 from a conventional pump, not shown, through pipe 20ᵃ and a flexible hose connection 21. This connection may be provided with a shut-off valve at 22. A branch pipe 23 provided with a shut-off valve 24 delivers spray material through a flexible hose 25 and pipe 26 to a spray nozzle 27, Figures 1 and 2, said spray nozzle discharging into a blower housing 28. This blower housing is fast upon the rear end of the tank 5 and its impeller is indicated at 29. Air is drawn through a screened opening 30 into the hollow hub of the impeller and said air along with the entrained spray material passes outwardly through the openings 31 and is discharged through the blower mouth 32 under the action of the blades 33. The construction of the blower mouth is important. By referring to Figure 2 it will be seen that its side walls 33ᵃ converge to lie relatively close to that portion of the pipe 8 which passes therethrough. The end walls of this housing are notched at 34 and 35 to receive the pipe so that the pipe may partially enter the housing. The converging of the walls 33ᵃ directs the air blast close to the pipe and to the nozzles 12ᵃ and causes the spray material delivered from the fan casing as well as that delivered from the nozzles 12ᵃ to be caught in the blast of air from the blower and to be directed forcibly into the tops of the trees. It is this arrangement which enables my device to so largely create its own wind and to overcome the unfavorable action of gusts of wind from other directions.

I also mount upon the end of the blower housing (see Figure 4) a deflector 36, the upper end of which is connected by a rod 37, with an ear 38 upon the pipe 8. When the pipe moves upwardly and outwardly the upper end of the deflector is drawn over toward the dotted line position illustrated in Figure 4 and tends to cause the direction of the air blast to follow the direction of discharge of the nozzles 12ᵃ. Since there is a gap between the fan-like web of spray material at a point adjacent the nozzles, the discharge from the blower casing tends to fill in these gaps and to create a solid sheet of spray material that is being discharged across the line of travel of the vehicle. Since the spray nozzles are disposed in a row it follows that the fan-like sheet of spray material is relatively narrow but this leads to very effective control by the operator of the vehicle. This is a one-man spray apparatus. With it one man can more effectively and accurately spray a row of trees than two men have heretofore been able to do with one doing the driving and the other handling the spray nozzle. With this apparatus the driver is located far enough away from the spray discharge to be free of the same and yet by manipulating the pipe 8 he can accurately and efficiently spray all portions of the trees.

Since many ways will suggest themselves to those skilled in the art of varying the mounting of the various elements shown, I wish it to be understood that the invention is not limited to the precise construction set forth, but that it includes within its purview, whatever changes fairly come within either the terms or the spirit of the appended claims.

Having described my invention, what I claim is:

1. In a power spraying apparatus, a wheeled vehicle, a tank for spray material thereon, an upstanding arcuate pipe carrying a row of outwardly directed spray nozzles along its convex side said convex side being disposed outwardly of the vehicle and a pivotal mounting for said pipe located at a point adjacent the lower end of said pipe and mounting said pipe to swing in vertical planes laterally across the line of travel of the vehicle and at one side of said vehicle and manually operable means for so swinging said pipe, the location of such pivotal mounting of the pipe adjacent its lower end causing the nozzles disposed along the upper portion of said pipe to have much greater swinging movement and much greater directional change than the nozzles adjacent such pivotal mounting a fixed blower casing having an outlet opening in the wall thereof, a blower in said casing, and means for mounting said casing in such position that the air blast therefrom will be discharged past said arcuate pipe upon each side of said pipe and in the direction of spray discharge.

2. In a power spraying apparatus, a wheeled vehicle, a spray tank thereon, an upstanding arcuate pipe comprising an approximately vertical lower portion and an upper portion which curves inwardly toward the longitudinal center line of the vehicle, a row of spray nozzles disposed along the convex outer side of said pipe, those nozzles disposed along the approximately vertical lower portion of the pipe discharging laterally of the line of travel of the vehicle and substantially horizontally and those nozzles along the upper portions of the pipe discharging radially of the pipe and at successively higher angles toward the upper end of said pipe, means for pivoting the pipe at a point much nearer its lower than its upper end, to swing laterally and in vertical planes across the line of travel of the vehicle and at one side thereof, the pivoting of the pipe much nearer its lower than its upper end causing those nozzles along the upper portion of the pipe to swing much farther and to have much greater directional change than the nozzles along the lower portion of said pipe, a blower casing, a blower therein, said casing having an outlet slot along its upper outer portion which slot faces in the direction of spray discharging from the spray nozzles and into which the upper portion of said pipe swings.

3. In a power spraying apparatus, a wheeled vehicle, a spray tank thereon, an upstanding arcuate pipe comprising an upper portion which curves inwardly toward the longitudinal center line of the vehicle, a row of spray nozzles disposed along the convex outer side of said pipe, those nozzles disposed along the lower portion of the pipe discharging laterally of the line of travel of the vehicle and substantially horizontally and those nozzles along the upper portions of the pipe discharging radially of the pipe and at successively higher angles toward the upper end of said pipe, means for pivoting the pipe at a point much nearer its lower than its upper end, to swing laterally and in vertical planes across the line of travel of the vehicle and at one side thereof, the pivoting of the pipe much nearer its lower than its upper end causing those nozzles along the upper portion of the pipe to swing much farther and to have much greater directional change than the nozzles along the lower portion of said pipe, a blower casing, a blower therein, said casing having an outlet slot along its upper outer portion which slot faces in the direction of spray discharging from the spray nozzles and into which slot the upper portion of said pipe swings and a deflector movable in synchronism with said pipe in a direction to direct the air from the blower farther downward as the pipe moves away from the blower casing.

4. In a power spraying mechanism of the type comprising a wheeled vehicle, means for propelling the same and an elongated spray tank horizontally disposed upon the vehicle and extending lengthwise of the same, of a blower casing mounted at the rear end of the tank and having a rotary blower therein which tends to discharge air radially from the blower casing, said casing having the upper portion of its peripheral or side wall provided with a mouth in the form of an elongated slot, an arcuate boom, disposed at a point rearwardly of the rear end of the tank with its convex side outwardly disposed, a row of outwardly discharging spray nozzles disposed along the outer side of said boom, means for supplying spray fluid to said spray nozzles throughout all positions of adjustment of said boom and a horizontal pivot rearwardly of the tank upon which the boom is mounted at a point much closer to the lower end of the boom than to the upper end thereof, the row of spray nozzles extending from the top of the boom to a point at least as low as said pivot, those spray nozzles adjacent the pivot discharging substantially horizontally across the line of travel of the vehicle and those spray nozzles along the upper portion of the boom discharging radially of the boom at successively higher angles, means for manually adjusting the boom in vertical planes about said pivot to cause its upper portion to swing laterally into or out of the slot of the blower casing, the blast of air from the mouth of said blower casing traveling past and upon each side of the boom and the nozzles which are opposite said mouth.

5. A structure as recited in claim 4 in combination with a deflector, and means for moving said deflector in unison with said boom said deflector being so shaped and positioned as to deflect the air discharged through the mouth of the casing toward the direction of spray discharge from the uppermost nozzles upon the boom.

CHARLES R. SHADE.

REFERENCES CITED

The following references are of record in the file of this patent:

UNITED STATES PATENTS

| Number | Name | Date |
|---|---|---|
| 2,238,120 | Launder | Apr. 15, 1941 |
| 2,310,895 | Brown | Feb. 9, 1943 |
| 2,374,955 | Raper | May 1, 1945 |
| 2,365,755 | Griffith | Dec. 26, 1944 |

FOREIGN PATENTS

| Number | Country | Date |
|---|---|---|
| 16,150 | Great Britain | July 7, 1897 |